United States Patent [19]
Saito et al.

[11] Patent Number: 5,925,721
[45] Date of Patent: Jul. 20, 1999

[54] PROCESS FOR PRODUCING VINYLIDENE FLUORIDE RESIN

[75] Inventors: Ryuichi Saito; Tadashi Amano, both of Kamisu-machi, Japan

[73] Assignee: Shin-Etsu Chemical Co., Ltd., Tokyo, Japan

[21] Appl. No.: 09/025,237

[22] Filed: Feb. 18, 1998

[30]     Foreign Application Priority Data

Feb. 18, 1997 [JP] Japan ................................. 9-049766

[51] Int. Cl.$^6$ ....................................... C08F 2/00
[52] U.S. Cl. ............................... 526/79; 526/206
[58] Field of Search ....................... 526/79, 206

[56]       References Cited

U.S. PATENT DOCUMENTS

| | | | |
|---|---|---|---|
| 3,600,369 | 8/1971 | Toyoda et al. | 526/79 |
| 4,027,086 | 5/1977 | Lo Valvo et al. | 526/79 |

FOREIGN PATENT DOCUMENTS 0743329  11/1996  European Pat. Off. .

*Primary Examiner*—Bernard Lipman
*Assistant Examiner*—N. Sarofim
*Attorney, Agent, or Firm*—Oblon, Spivak, McClelland, Maier & Neustadt, P.C.

[57]       ABSTRACT

In a process for producing a vinylidene fluoride resin by polymerizing vinylidene fluoride or a mixture of vinylidene fluoride and a vinyl monomer copolymerizable with vinylidene fluoride, a portion of an iodide compound represented by the formula: $X-R_f-X$ wherein $R_f$ is a divalent organic group containing at least two divalent fluoroalkyl ether groups: and X's are independently an iodine atom or a fluorine atom, provided that at least one of the X's is an iodine atom; is added to start the polymerization, and the remainder of the iodide compound is further added dividedly at least twice in the course of the polymerization. This process enables to obtain a vinylidene fluoride resin having a viscosity-average molecular weight of 150,000 or more and also having a superior water repellency. This resin has good mechanical strength and release properties and also can be well processed into films.

8 Claims, No Drawings

PROCESS FOR PRODUCING VINYLIDENE FLUORIDE RESIN

BACKGROUND OF THE INVENTION

1. Field of the Invention

This invention relates to a process for producing a vinylidene fluoride resin, and more particularly to a process for producing with ease a vinylidene fluoride resin having a superior water repellency and having a controlled molecular weight.

2. Description of the Prior Art

Polyvinylidene fluoride is used in various fields because of its superior weatherability, corrosion resistance, electrical properties, processability and so forth. However, polyvinylidene fluoride has the disadvantage that its water repellency is a little inferior to fluoride resins of different types.

Accordingly, in order to improve the water repellency, it is necessary to produce a block copolymer of vinylidene fluoride with a fluorine-rich monomer such as hexafluoropropylene, tetrafluoroethylene or the like. For example, it is known to use a method of successive growth that is employed in the production of living polymers, a method of coupling at least two polymers, a method of subjecting terminal functional groups to polyaddition or polycondensation or a method of radical polymerization.

In these methods, however, the fluorine-rich monomer has a polymerization rate lower than that of the vinylidene fluoride monomer, so that the vinylidene fluoride monomer undergoes polymerization in preference to the fluorine-rich monomer to cause the problem that the fluorine-rich monomer is concentrically introduced into the terminal sites of the molecule. Further, there are problems such that homopolymers tend to be formed as by-products and the molecular weight of the resin can be controlled with difficulty. In particular, a copolymer with an excessively large molecular weight (e.g., a viscosity-average molecular weight of 500,000 or more) has so high a melt viscosity that its processability into films or the like is deteriorated.

SUMMARY OF THE INVENTION

Accordingly, an object of the present invention is to solve the above problems and provide a process for producing with ease a vinylidene fluoride resin having a superior water repellency and having a molecular weight range so controlled as to be suited for its processability into films or the like.

As a result of extensive studies, the present inventors have discovered that the above object can be achieved by the following production process.

The present invention provides a process for producing a vinylidene fluoride resin, wherein vinylidene fluoride or a mixture of vinylidene fluoride and a vinyl monomer copolymerizable with vinylidene fluoride is polymerized, comprising:

starting the polymerization by adding a part of an iodide compound represented by the general formula (1):

$$X-R_f-X \tag{1}$$

wherein $R_f$ is a divalent organic group containing at least two divalent fluoroalkyl ether groups; X's are independently an iodine atom or a fluorine atom, provided that at least one of the X's is an iodine atom; and further adding the remainder of the iodide compound dividedly at least twice in the course of the polymerization.

The production process of the present invention enables to obtain a vinylidene fluoride resin having a high molecular weight (viscosity-average molecular weight of 150,000 or more; the viscosity-average molecular weight is measured by the method described later in Examples) and also having a superior water repellency. This resin is superior in mechanical strength and release properties, and processability into films or the like, so its uses for coating materials, elastomers and so forth are expected.

DETAILED DESCRIPTION OF THE PREFERRED EMBODIMENTS

The process for producing a vinylidene fluoride resin according to the present invention will be described below in detail.

Starting materials

In the production process of the present invention, vinylidene fluoride and an iodide compound of general formula (1) are used as essential starting materials, and if necessary, a vinyl monomer copolymerizable with vinylidene fluoride may also be used in combination.

As the vinyl monomer, perfluoroalkylene compounds such as hexafluoropropylene, pentafluoropropylene, tetrafluoroethylene and the like are preferable in view of obtaining a resin with a superior water repellency.

The vinyl monomer may be used in an amount of usually from 0 to 10 parts by weight based on 100 parts by weight of the vinylidene fluoride, and preferably from 0 to 5 parts by weight in view of preventing the formation of homopolymers of the vinyl monomer.

The iodide compound used in the present invention is a compound represented by the general formula (1):

$$X-R_f-X \tag{1}$$

wherein $R_f$ is a divalent organic group containing at least two divalent fluoroalkyl ether groups; and X's are independently an iodine atom or a fluorine atom, provided that at least one of the X's is an iodine atom.

This iodide compound is introduced into the resultant resin while acting as a chain transfer agent. More specifically, for example, when the iodide compound of the general formula (1) is added to the vinylidene fluoride monomer, there is obtained a prepolymer represented by the following formula (2):

$$X-(CH_2CF_2)_p-R_f-(CH_2CF_2)_p-X \tag{2}$$

wherein p's are independently an integer of 1 or more, and $R_f$ and X have the same meanings as mentioned above. This prepolymer has molecular chain terminals having a polymerization activity, and hence undergoes further polymerization in the "living" fashion to finally yield a high-molecular weight block copolymer having a structural unit represented by the following formula:

$$[-(CH_2CF_2)_p-R_f-]$$

wherein p and $R_f$ have the same meanings as mentioned above.

This block copolymer can be a resin having a superior water repellency and also being capable of exhibiting flexibility due to the at least two fluoroalkyl ether groups of the $R_f$ group.

The divalent organic group represented by $R_f$ may include, e.g., groups represented by the following general formulas (3) and (4):

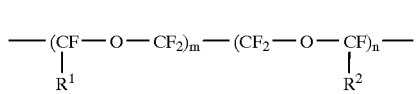

wherein m and n are an integer of 0 or positive number satisfying $m+n \geq 2$, and preferably $2 \leq m+n \leq 10$; and $R^1$ and $R^2$ are independently $-CF_3$ or $-CF_2CF_3$; and

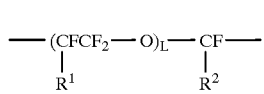

wherein L is an integer of 2 or more, and preferably an integer satisfying $2 \leq L \leq 10$; and $R^1$ and $R^2$ are independently $-CF_3$ or $-CF_2CF_3$.

Examples of the iodide compound are shown below.

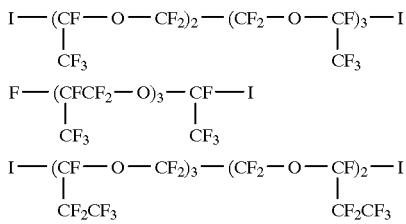

Of the above iodide compounds, compounds wherein iodine atoms as the X's groups are bonded to the both terminals of the group represented by the general formula (3) are preferred in view of enabling easy production of the resin having a controlled molecular weight.

Any of these iodide compounds may be used alone or in a combination of two or more thereof.

The iodide compound may be used in an amount of usually from 3 to 20 parts by weight, and preferably from 5 to 15 parts by weight, based on 100 parts by weight of the vinylidene fluoride or the aforementioned mixture (a mixture of vinylidene fluoride and a vinyl monomer copolymerizable with vinylidene fluoride), in the whole polymerization reaction. If the amount of the iodide compound is too small, a vinylidene fluoride resin having a good water repellency can not be obtained and also there may be formed a by-product vinylidene fluoride homopolymer. If on the other hand it is too large, the resultant resin may be too much low in viscosity-average molecular weight to obtain a resin having good film-forming properties.

Polymerization

To polymerize vinylidene fluoride or a mixture of vinylidene fluoride and a vinyl monomer copolymerizable with vinylidene fluoride (these starting materials are especially called "the charged monomers") together with the iodide compound, any conventional known polymerization methods may be used without any particular limitations, provided that a part of the iodide compound is added to the charged monomers before the initiation of polymerization and the remainder of the iodide compound is further added dividedly at least twice in the course of the polymerization.

Stated specifically, a method may be employed in which the charged monomers are subjected to suspension polymerization or emulsion polymerization usually in an aqueous medium in the presence of a polymerization initiator. It is preferable to use suspension polymerization.

As described above, it is essential for the iodide compound that a part of the iodide compound is added before the initiation of polymerization and the remainder of the iodide compound is further added dividedly at least twice in the course of the polymerization. During the polymerization, the iodide compound may preferably be added dividedly preferably at least three times, more preferably at least four times, and particularly preferably from three times to 20 times. If its addition is divided less than three times, a resin having a high molecular weight (e.g., a viscosity-average molecular weight of 150,000 or more) can not be obtained in some cases, resulting in a low mechanical strength of films obtained by processing the resin.

The amount of the iodide compound added before the initiation of polymerization and the amount of the iodide compound added at every time during the polymerization may each be usually from 0.5 to 3 parts by weight, and preferably from 0.5 to 2 parts by weight, based on 100 parts by weight of the charged monomers.

During polymerization, the iodide compound is added when preferably from 10 to 25% by weight, more preferably from 12 to 22% by weight, of the monomers which remained unreacted at the previous addition of the iodide compound has been polymerized on converted into a polymer. Thus, the first addition during the polymerization is performed when from 10 to 25% by weight of the whole charged monomers has been converted, and the second addition during the polymerization is performed when from 10 to 25% by weight of the monomers remaining unreacted at the first addition after the initiation of polymerization has been converted. Addition of the iodide compound at the time when the polymerization conversion rate is less than 10% by weight may make the resultant resin have a low viscosity-average molecular weight. Its addition at the time when the polymerization conversion rate is more than 25% by weight may form a by-product vinylidene fluoride homopolymer.

As means for adding the iodide compound to the reaction system, a constant-rate pump or the like may be used in usual instances.

The polymerization initiator may include organic peroxides, e.g., lower-alkyl peroxydicarbonates such as iso-propyl peroxydicarbonate, n-propyl peroxydicarbonate and the like; peresters such as t-butyl peroxyisobutyrate and the like; and perfluoroxides such as heptafluorobutyryl peroxide and the like. Any of these may be used alone or in a combination of two or more thereof. The polymerization initiator may be used in an amount of usually from 0.05 to 5.0 parts by weight, and preferably from 0.5 to 2.0 parts by weight, based on 100 parts by weight of the vinylidene fluoride monomer.

As a dispersant used in suspension polymerization, a water-soluble high molecular compound is commonly used, which may include, e.g., methyl cellulose, hydroxypropyl cellulose, hydroxypropyl methyl cellulose, and water-soluble or oil-soluble partially-saponified polyvinyl alcohols. The dispersant may be used in an amount of usually from 0.01 to 5 parts by weight, and preferably from 0.05 to 2.0 parts by weight, based on 100 parts by weight of the vinylidene fluoride monomer.

A hydrophobic halogenated hydrocarbon type solvent such as 1,2-dichlorotetrafluoroethane, dichloropentafluoropropane or the like may also be optionally used together with the dispersant. The solvent may be preferably used in an amount of 1 to 20 parts by weight based on 100 parts by weight of the vinylidene fluoride monomer.

The polymerization temperature when the polymerization is carried out in the aqueous medium is usually from 10 to 25° C. and the polymerization pressure is usually from 10 to 50 kgf/cm².

The vinylidene fluoride resin thus obtained has a viscosity-average molecular weight of usually from 150,000 to 350,000. Vinylidene fluoride resins having viscosity-average molecular weight within this range are excellent in processability into films or the like, and the resultant films have superior physical properties such as mechanical strength and the like.

The resin obtained has a contact angle to water equivalent to the contact angle of Teflon (polytetrafluoroethylene) plates (i.e., 110 degrees) and shows a good water repellency.

The vinylidene fluoride resin of the present invention, having the above properties, is suitable for uses requiring processability into films, mechanical strength, chemical resistance, release properties, water repellency and so forth, e.g., for release films, packings, gaskets, paints and elastomers.

EXAMPLES

The present invention will be specifically described below by giving Examples and Comparative Examples. In the following description, "part(s)" means "part(s) by weight".

Example 1

300 parts of water and 0.1 part of methyl cellulose were put into a 2 liter pressure reactor made of stainless steel, and thereafter the inside of the system was evacuated. Subsequently, 100 parts of vinylidene fluoride monomer was charged into it, followed by adding 0.5 part of n-propyl peroxydicarbonate, 20 parts of dichloropentafluoropropane and 1.0 part of an iodide compound represented by the following formula (5):

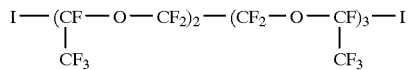

using a constant-rate pump. Next, after the temperature of the system was raised to 25° C., the polymerization was started with stirring at 450 rpm while maintaining that temperature.

After the polymerization was started, the iodide compound of the formula (5) was further added in the amount as shown in Table 1, at the time when the polymerization conversion rate reached the value as shown in Table 1.

15 hours after the start of the polymerization was passed and the inside pressure was lowered to 27 kg/cm², where the gases and unreacted vinylidene fluoride monomer inside the system were recovered, followed by dehydrating and drying to obtain a vinylidene fluoride resin (yield: 62%).

The viscosity-average molecular weight of this vinylidene fluoride resin was measured in the following way to find that it was 300,000.

Measurement of viscosity-average molecular weight

Each of 0.1 g, 0.2 g and 0.3 g of the above vinylidene fluoride resin was precisely weighed and put into a 50 ml measuring flask, and then dissolved in 50 ml of dimethylformamide (hereinafter referred to as "DMF") to prepare a solution. Subsequently, the specific viscosity at 30° C. of the solution was measured using a Ubbellohde viscometer.

Intrinsic viscosity was determined from the resultant specific viscosity and the concentration of the solution, and the value obtained was substituted for the following conversion expression to determine the viscosity-average molecular weight.

Viscosity-average molecular weight=[intrinsic viscosity/$(3.8 \times 10^{-3})]^{1.25}$ This conversion expression is an expression applied to the homopolymer of vinylidene fluoride, and hence the viscosity-average molecular weight is an approximate value given by assuming the vinylidene fluoride resin as the vinylidene fluoride homopolymer.

With regard to the vinylidene fluoride resin thus obtained, its processability was evaluated and its contact angle was measured in the following way. Results obtained are shown in Table 4.

Evaluation of processability

The processability of the vinylidene fluoride resin was evaluated as film-forming properties. More specifically, 1 g of the above vinylidene fluoride resin was put in the form of a circle having a diameter of 8 cm on a stainless steel plate, and its surface was covered with another stainless steel plate. These stainless steel plates were inserted to a hydraulic molding machine with an output of 37 t, manufactured by Toho Machinery Co., and preheated at a temperature of 180° C. for 2 minutes, followed by applying a pressure of 150 kgf/cm² at the same temperature to form a film. The film thus formed on the stainless steel plate was cooled to 30° C., and thereafter evaluated according to the following criteria.

A: No crack occurs on the film surface.
B: One or two cracks occur on the film surface.
C: Three or more cracks occur on the film surface.

Measurement of contact angle

The above vinylidene fluoride resin was dissolved in DMF to prepare a 5% by weight solution. Subsequently, a test piece of 0.3 mm×25 mm×100 mm made of stainless steel was dipped in this solution to coat the test piece with the resin. Thereafter, the coated test piece was air-dried for 30 minutes, and further heated at a temperature of 150° C. for 30 minutes to completely remove the DMF. The contact angle of the resultant film to water was measured using a QI optical mirror type contact angle meter MODEL CA-A (manufactured by Kyowa Kaimen Kagaku K.K.).

TABLE 1

| | Polymerization conversion rate of the whole charged monomers (wt. %) | Polymerization conversion rate of the unreacted monomers[1] (wt. %) | Amount of iodide compound added (part) |
|---|---|---|---|
| Before polymerization: | 0 | 0 | 1 |
| During polymerization: | | | |
| First time: | 13 | 13 | 1 |
| Second time: | 26 | 15 | 1 |
| Third time: | 38 | 16 | 1 |
| Fourth time: | 52 | 22 | 1 |

[1]Polymerization conversion rate of the unreacted monomers: Polymerization conversion rate of the monomers remaining unreacted at the time of the previous addition of the iodide compound.

Example 2

250 parts of water and 0.1 part of methyl cellulose were put into a 2 liter pressure reactor made of stainless steel, and thereafter the inside of the system was evacuated.

Subsequently, 100 parts of vinylidene fluoride monomer was charged into it, followed by adding 1.0 part of isopropyl peroxydicarbonate, 20 parts of dichloropentafluoropropane and 2.0 parts of the iodide compound represented by the formula (5) using a constant-rate pump.

Next, after the temperature of the system was raised to 25° C., the polymerization was started with stirring at 550 rpm while maintaining that temperature. After the polymerization was started, the iodide compound of the formula (5) was further added in the amount as shown in Table 2, at the time when the polymerization conversion rate reached the value as shown in Table 2.

15 hours after the start of the polymerization was passed and the internal pressure was lowered to 20 kg/cm$^2$, where the gases and unreacted vinylidene fluoride monomer inside the system were recovered, followed by dehydrating and drying to obtain a vinylidene fluoride resin (yield: 68%).

The viscosity-average molecular weight of the resin obtained was measured, its processability was evaluated and its contact angle was measured in the same manner as in Example 1. Results obtained are shown in Table 4.

TABLE 2

|  | Polymerization conversion rate of the whole charged monomers (wt. %) | Polymerization conversion rate of the unreacted monomers[1] (wt. %) | Amount of iodide compound added (part) |
| --- | --- | --- | --- |
| Before polymerization: | 0 | 0 | 2 |
| During polymerization: |  |  |  |
| First time: | 12 | 12 | 2 |
| Second time: | 23 | 13 | 2 |
| Third time: | 35 | 15 | 2 |
| Fourth time: | 46 | 17 | 2 |

[1]Polymerization conversion rate of the unreacted monomers: Polymerization conversion rate of the monomers remaining unreacted at the time of the previous addition of the iodide compound.

Example 3

300 parts of water and 0.1 part of methyl cellulose were put into a 5 liter pressure reactor made of stainless steel, and thereafter the inside of the system was evacuated. Subsequently, 100 parts of vinylidene fluoride monomer was charged into it, followed by adding 1.5 parts of n-propyl peroxydicarbonate, 20 parts of dichloropentafluoropropane and 2.0 parts of the iodide compound represented by the formula (5) using a constant-rate pump.

Next, after the temperature of the system was raised to 25° C., the polymerization was started with stirring at 450 rpm while maintaining that temperature. After the polymerization was started, the iodide compound of the formula (5) was further added in the amount as shown in Table 3, at the time when the polymerization conversion rate reached the value as shown in Table 3.

15 hours after the start of the polymerization was passed and the internal pressure was lowered to 16 kg/cm$^2$, where the gases and unreacted vinylidene fluoride monomer inside the system were recovered, followed by dehydrating and drying to obtain a vinylidene fluoride resin (yield: 72%).

The viscosity-average molecular weight of the resin obtained was measured, its processability was evaluated and its contact angle was measured in the same manner as in Example 1. Results obtained are shown in Table 4.

TABLE 3

|  | Polymerization conversion rate of the whole charged monomers (wt. %) | Polymerization conversion rate of the unreacted monomers[1] (wt. %) | Amount of iodide compound added (part) |
| --- | --- | --- | --- |
| Before polymerization: | 0 | 0 | 2 |
| During polymerization: |  |  |  |
| First time: | 12 | 12 | 2 |
| Second time: | 36 | 13 | 2 |
| Third time: | 35 | 15 | 2 |
| Fourth time: | 46 | 17 | 2 |

[1]Polymerization conversion rate of the unreacted monomers: Polymerization conversion rate of the monomers remaining unreacted at the time of the previous addition of the iodide compound.

Comparative Example 1

300 parts of water and 0.1 part of methyl cellulose were put into a 2 liter pressure reactor made of stainless steel, and thereafter the inside of the system was evacuated. Subsequently, 100 parts of vinylidene fluoride monomer was charged into it, followed by adding 1.5 parts of n-propyl peroxydicarbonate, 10 parts of dichloropentafluoropropane and 1.5 parts of isopropyl alcohol using a constant-rate pump.

Next, after the temperature of the system was raised to 25° C., the polymerization was initiated with stirring at 450 rpm while maintaining that temperature.

15 hours after the start of the polymerization was passed and the internal pressure was lowered to 20 kg/cm$^2$, where the gases and unreacted vinylidene fluoride monomer inside the system were recovered, followed by dehydrating and drying to obtain polyvinylidene fluoride (yield: 70%).

The viscosity-average molecular weight of the polyvinylidene fluoride obtained was measured, its processability was evaluated and its contact angle was measured in the same manner as in Example 1. Results obtained are shown in Table 4.

Comparative Example 2

300 parts of water and 0.1 part of methyl cellulose were put into a 2 liter pressure reactor made of stainless steel, and thereafter the inside of the system was evacuated. Subsequently, 100 parts of vinylidene fluoride monomer was charged into it, followed by adding 1.5 parts of n-propyl peroxydicarbonate, 10 parts of dichloropentafluoropropane and 5.0 parts of the iodide compound represented by the formula (5) using a constant-rate pump.

Next, after the temperature of the system was raised to 25° C., the polymerization was started with stirring at 450 rpm while maintaining that temperature.

15 hours after the start of the polymerization was passed and the internal pressure was lowered to 27 kg/cm$^2$, where the gases and unreacted vinylidene fluoride monomer inside the system were recovered, followed by dehydrating and drying to obtain a vinylidene fluoride resin (yield: 57%).

The viscosity-average molecular weight of the resin obtained was measured, its processability was evaluated and its contact angle was measured in the same manner as in Example 1. Results obtained are shown in Table 4.

TABLE 4

|  | Example 1 | Example 2 | Example 3 | Comparative Example 1 | Comparative Example 2 |
|---|---|---|---|---|---|
| Viscosity-average molecular weight: | 300,000 | 248,000 | 208,000 | 379,000 | 139,000 |
| Film-forming properties: | A | B | B | B | C |
| Contact angle (degrees): | 103 | 108 | 107 | 93 | 104 |

What is claimed is:

1. A process for producing a vinylidene fluoride resin, wherein vinylidene fluoride or a mixture of vinylidene fluoride and a vinyl monomer copolymerizable with vinylidene fluoride is polymerized, which comprises:

starting the polymerization by adding a part of an iodide compound represented by formula (1):

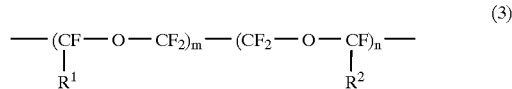

wherein $R_f$ is a divalent organic group of formula (3) wherein m and n are each an integer of 0 or a positive number satisfying m+n≧2; and $R^1$ and $R^2$ are independently —$CF_3$ or —$CF_2CF_3$; or a group of formula (4):

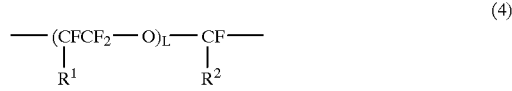

wherein L is an integer of 2 or more; and $R^1$ and $R^2$ are independently —$CF_3$ or —$CF_2CF_3$, X's are independently an iodine atom or a fluorine atom, provided that at least one of the X's is an iodine atom, to the polymerizable monomers; and further adding the remainder of the iodide compound dividedly at least twice in the course of the polymerization.

2. The process for producing a vinylidene fluoride resin according to claim 1, wherein in the course of the polymerization, the iodide compound is added when from 10 to 25% by weight of the monomers remaining unreacted at the previous addition of the iodide compound, has been converted into a polymer.

3. The process for producing a vinylidene fluoride resin according to claim 1, wherein said remainder of the iodide compound is added dividedly at least three times.

4. The process for producing a vinylidene fluoride resin according to claim 1, wherein the amount of the iodide compound added before the polymerization and the amount of the iodide compound added at every time during the polymerization is each from 0.5 part by weight to 3 parts by weight based on 100 parts by weight of the vinylidene fluoride or the mixture.

5. The process for producing a vinylidene fluoride resin according to claim 1, wherein the total amount of said iodide compound added in the whole polymerization reaction is from 3 parts by weight to 20 parts by weight based on 100 parts by weight of the vinylidene fluoride or the mixture.

6. The process for producing a vinylidene fluoride resin according to claim 1, wherein said polymerization is carried out by suspension polymerization.

7. The process for producing a vinylidene fluoride resin according to claim 1, wherein said polymerization is carried out in an aqueous medium at a polymerization temperature of from 10° C. to 25° C. and under a pressure of from 10 kgf/cm² to 50 kgf/cm².

8. The process for producing a vinylidene fluoride resin according to claim 1, wherein the divalent organic group represented by $R_f$ in the general formula (1) is the group represented by the general formula (3) in claim 8, and the groups X's at the both terminals in the general formula (1) are both iodine atoms.

* * * * *